(12) United States Patent
Curlett

(10) Patent No.: US 7,753,122 B2
(45) Date of Patent: Jul. 13, 2010

(54) METHOD OF DEVELOPING AND PRODUCING DEEP GEOTHERMAL RESERVOIRS

(75) Inventor: Harry B. Curlett, Cody, WY (US)

(73) Assignee: TerraWatt Holdings Corporation, Powell, WY (US)

( * ) Notice: Subject to any disclaimer, the term of this patent is extended or adjusted under 35 U.S.C. 154(b) by 197 days.

(21) Appl. No.: 10/581,648

(22) PCT Filed: Jun. 23, 2005

(86) PCT No.: PCT/US2005/022305

§ 371 (c)(1),
(2), (4) Date: Apr. 13, 2007

(87) PCT Pub. No.: WO2006/002325

PCT Pub. Date: Jan. 5, 2006

(65) Prior Publication Data

US 2007/0223999 A1      Sep. 27, 2007

Related U.S. Application Data

(60) Provisional application No. 60/582,626, filed on Jun. 23, 2004, provisional application No. 60/650,667, filed on Feb. 7, 2005.

(51) Int. Cl.
*E21B 36/00* (2006.01)
*E21B 43/26* (2006.01)
*E21B 7/18* (2006.01)

(52) U.S. Cl. ............... 166/302; 166/52; 166/305.1; 166/308.1; 175/67; 60/641.2; 60/641.3

(58) Field of Classification Search ............... 166/52, 166/308.1, 305.1, 302; 175/67; 165/45; 60/641.1–641.5
See application file for complete search history.

(56) References Cited

U.S. PATENT DOCUMENTS

| | | | |
|---|---|---|---|
| 3,231,031 A | 1/1966 | Cleary | |
| 3,348,189 A | 10/1967 | Coldren et al. | |
| 3,375,886 A | 4/1968 | Goodwin et al. | |
| 3,640,336 A | 2/1972 | Dixon | |
| 3,786,858 A | 1/1974 | Potter et al. | |
| 3,817,038 A | 6/1974 | Paull et al. | |
| 3,853,759 A | 12/1974 | Titmas | |
| 3,863,709 A | 2/1975 | Fitch | |
| 3,975,912 A | 8/1976 | Greene | |
| 4,043,386 A | 8/1977 | Franz et al. | |
| 4,113,446 A | 9/1978 | Modell et al. | |

(Continued)

OTHER PUBLICATIONS

Geodynamics Limited, "Quarterly Report", period ending Mar. 31, 2004, 8 pages.

(Continued)

*Primary Examiner*—Giovanna C Wright
(74) *Attorney, Agent, or Firm*—Winstead PC

(57) ABSTRACT

The present invention relates to a method and system for extracting and/or utilizing thermal energy from rock formations. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims. 37 CFR 1.72(b).

52 Claims, 7 Drawing Sheets

U.S. PATENT DOCUMENTS

| | | |
|---|---|---|
| 4,200,152 A | 4/1980 | Foster et al. |
| 4,338,199 A | 7/1982 | Modell |
| 4,458,492 A | 7/1984 | Ziegenhain |
| 4,594,164 A | 6/1986 | Titmas |
| 4,676,563 A | 6/1987 | Curlett et al. |
| 4,683,944 A | 8/1987 | Curlett |
| 4,712,380 A | 12/1987 | Smith |
| 4,792,408 A | 12/1988 | Titmas |
| 4,799,544 A | 1/1989 | Curlett |
| 4,836,305 A | 6/1989 | Curlett |
| 4,924,949 A | 5/1990 | Curlett |
| 5,199,512 A | 4/1993 | Curlett |
| 5,291,957 A | 3/1994 | Curlett |
| 5,311,741 A | 5/1994 | Blaize |
| 5,515,679 A | 5/1996 | Shulman |
| 5,542,486 A | 8/1996 | Curlett |
| 5,685,362 A | 11/1997 | Brown |
| 5,862,871 A | 1/1999 | Curlett |
| 6,386,300 B1 | 5/2002 | Curlett et al. |
| 6,581,700 B2 | 6/2003 | Curlett et al. |
| 2002/0100615 A1 | 8/2002 | Curlett et al. |

OTHER PUBLICATIONS

Duchane, Dave et al., "Hot Dry Rock (HDR) Geothermal Energy Research and Development At Fenton Hill, New Mexico", GHC Bulletin, Dec. 2002, pp. 13-19.

Tester, J.W. et al., "Prospects for Universal Geothermal Energy from Heat Mining", Science & Global Security, 1994, vol. 5, pp. 99-123.

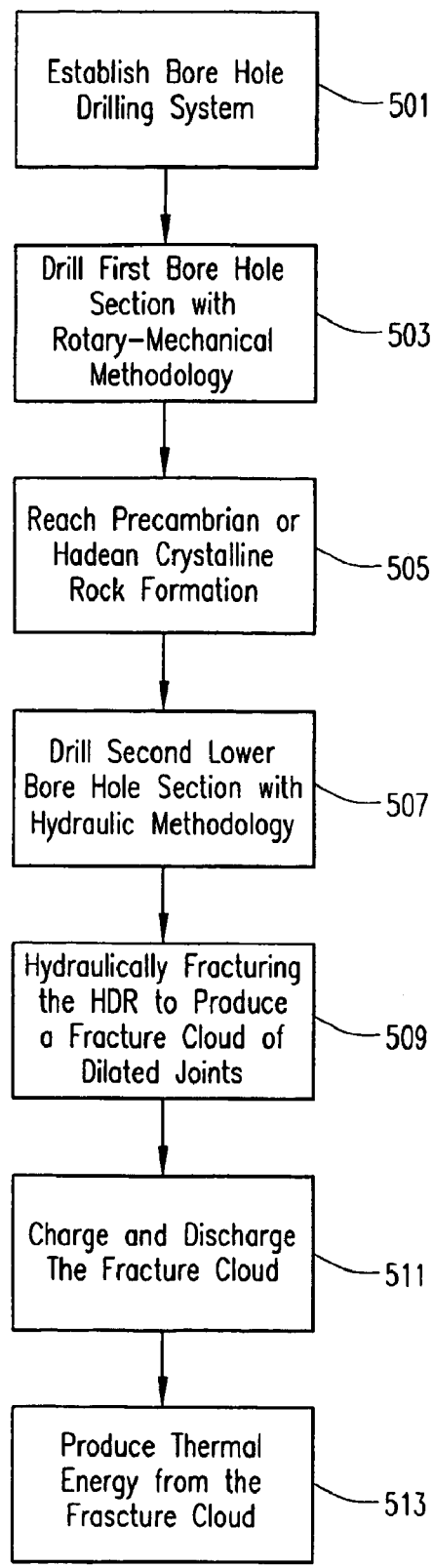
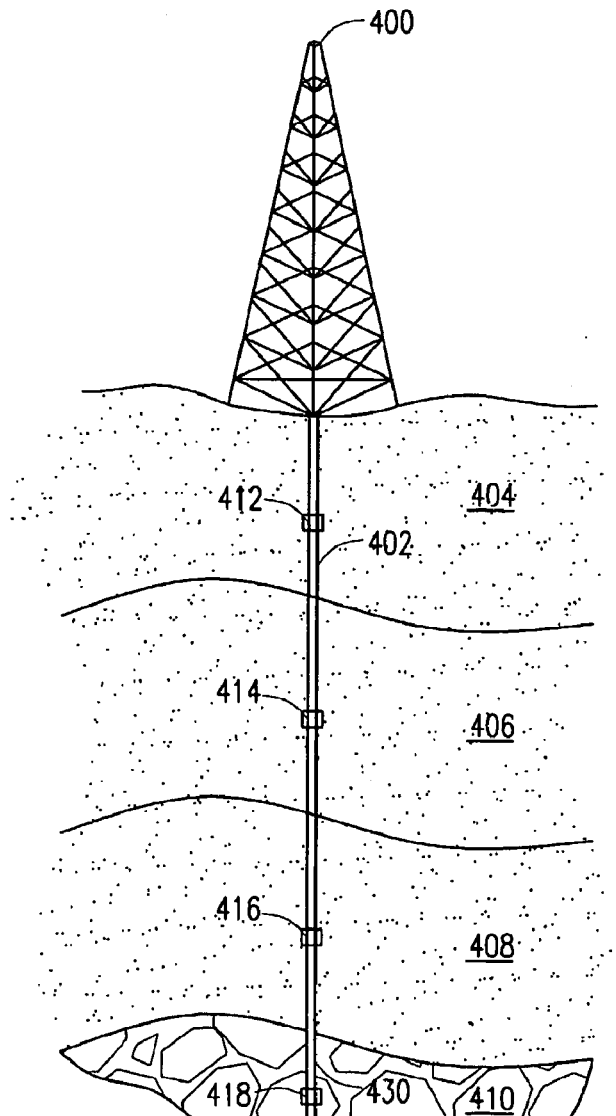
FIG. 7
FIG. 8

METHOD OF DEVELOPING AND PRODUCING DEEP GEOTHERMAL RESERVOIRS

CROSS-REFERENCE TO RELATED APPLICATIONS

The present application claims priority to and incorporates by reference the entire disclosure of U.S. Provisional Patent Application No. 60/582,626 filed on Jun. 23, 2004 and U.S. Provisional Patent Application No. 60/650,667 filed on Feb. 7, 2005.

BACKGROUND OF THE INVENTION

1. Field of the Invention

The present invention relates to the drilling of well bores, well completion methods, and the extraction and/or utilization of thermal energy from rock formations beneath the surface of the earth.

2. History of Related Art

Permeable geologic strata having high temperatures are found in numerous site-specific locations around the globe. When meteoric water percolates down into these formations, the water is heated and may flow to the surface as geysers and hot springs. Impermeable geologic rock formations, typically Precambrian rocks, having high temperatures are found almost everywhere around the globe and are generally located at deeper depths than high temperature permeable geologic strata which is typically sedimentary rock in nature. These impermeable Precambrian formations are generally considered dry and heat may be recovered from these formations by means of the hot dry rock (HDR) geothermal production process in which water is pumped down a well drilled into these deep hot impermeable rock formations and heated by contact with the rock. If the rock in its natural state does not have a sufficient network of cracks and fissures for the water to flow through to pick up heat, as is the usual case, the rock is hydraulically fractured to produce such a fracture network by means of fluid pressure. Various means to continuously circulate the heat from these HDR formations have been established.

Today, energy is supplied primarily by fossil fuels such as coal, oil, and gas. These resources are finite and are expected so to be in short supply in the readily foreseeable future. Also, the use of fossil fuels appears to cause serious environmental problems. Further, the United States currently imports a large percentage of its oil. Dependence on foreign oil is increasing as domestic reserves diminish. Thus, development of alternative sources of energy is necessary. When coal is burned, significant amounts of sulfur and nitrogen oxides are released to the atmosphere. These gases combine with water in the atmosphere to produce acids, which are brought to earth by rainfall downwind of the emissions source. This "acid rain" has a deleterious effect on aquatic and plant life. On a mere long-range scale, the atmosphere may be warming because of the "greenhouse effect" which may be caused by large quantities of carbon dioxide being released to the atmosphere as a result of burning of fossil as fuels. The long-term consequences of the greenhouse effect are currently a matter of debate; they may include melting of the polar ice caps, with the resultant increase in sea level and flooding of coastal cities, and increased desertification of the planet. Evidence pointing toward greenhouse effect warming includes increases in the carbon dioxide, content of the atmosphere over the past century and weather records that seem to indicate an upward trend in atmospheric temperatures. These facts point to the need, to consider mitigating action now, before we are overtaken by our own emissions.

Hydropower, the world's primary non-fossil energy source, is both inexpensive and clean. Hydropower has been widely developed in many parts of the world, but will never fill more than a small part of the world's total energy needs. Other alternative energy sources are nuclear fission, solar, wind, fusion, and geothermal. Nuclear fission is already widely used, but is currently suffering from a lack of public confidence, particularly in the United States, as the result of common knowledge of such incidents as Three Mile Island and Chernobyl. There are few nuclear power plants currently in the planning or construction stages. Solar power has been demonstrated on a small scale, as has wind power. Although both of these are renewable energy sources, they are subject to the whims of local weather conditions and can be relied upon to deliver power only intermittently. Nuclear fusion is, potentially, an almost unlimited source of energy, relying for fuel upon isotopes of hydrogen, which are found in abundant amounts in seawater. However, fusion has been unambiguously demonstrated only in the highly intractable form of a thermonuclear explosion. Decades may pass before ignition and containment of a fusion reaction by controllable, non-nuclear ignition sources, such as lasers, will be developed to the point where nuclear fusion may find practical application as a power source.

Geothermal resources, in the form of naturally occurring hydrothermal fluid systems, are being exploited today to provide useful energy as electrical power or heat in many parts of the world. At present, hydrothermal sources provide only a minute fraction of the world's energy needs, though the potential resource base available for exploitation is of the same order of magnitude as fossil fuel resources. Hydrothermal resources are much cleaner than fossil fuels with regard to greenhouse gas emissions, generally releasing only about 10 percent or less of the amount of carbon dioxide produced by burning an energy-equivalent amount of fossil fuel. However, hydrothermal resources are of limited geographical extent, occurring primarily in areas of tectonic or volcanic activity. Thus, many densely inhabited parts of the world are poorly located for the exploitation of hydrothermal sources.

Hot Dry Rocks (HDR), typically Precambrian rocks, underlie much of the globe. Unlike hydrothermal resources, HDR is widely distributed about the earth, generally underlying the sedimentary based hydrothermal formations. The HDR resource potential is a resource of vast magnitude and, like fusion, HDR can provide an almost unlimited source of energy for the planet. Hydrothermal plants now in operation demonstrate conclusively that the heat of the earth can be used as a practical source of both thermal and electrical energy. The HDR process is a logical extension of hydrothermal technology to tap into a vastly larger and universally distributed energy resource.

The conventional teaching of extracting energy from HDR involves creation of a closed liquid circulation system comprised of an HDR reservoir and the above-ground equipment. Initially, an injection well is drilled into hot dry rock and hydraulic fracturing techniques are used to induce permeability by stimulating existing natural joints or creating new fractures. Hydraulic stimulation and fracturing are widely used in petroleum recovery. An HDR reservoir is thus created, the size of which is governed by the pressure, rate and volume of the hydraulic fracturing fluid applied to the rock, the nature of the rock structure, and in situ stresses as have been clearly demonstrated in modern HDR completions such as those cited in Geodynamics Limited Quarterly Report period ending Mar. 31, 2004. Additional wells are subsequently drilled to provide the rest of the fluid circuitry necessary for establishing the closed loop circulation system. To produce heat production, liquid is pumped down the injection well, heated by the hot rock of the HDR reservoir, and recovered from a second well, a production well, drilled into the reservoir at some distance from the injection well. Multiple injection and recovery wells may be used within the basic closed loop circulation system. Heat exchangers at the surface are used to recover the heat from the water for use in electric power generation or for direct thermal applications. The water is then re-injected into the HDR reservoir via the injection well. In this manner, heat can be continuously mined from otherwise inaccessible geothermal sources. Essentially no venting of gaseous or saline fluids to the environment occurs. Thus, the HDR process does not emit carbon dioxide or acid rain precursors, such as sulfur dioxide, and is in the same class as solar, wind, or hydro-power in being an environmentally benign source of energy. The primary application of water heated in an HDR reservoir will be to generate steam or to vaporize another working fluid, such as ammonia or isobutane, for use in producing electric power.

U.S. Pat. No. 3,786,858, issued Jan. 22, 1974, describes the HDR process. A publication issued by the Los Alamos National Laboratory in July, 1989 which is designated LA-1 15 14-MS and entitled "Hot Dry Rock Geothermal Energy a New Energy Agenda for the 21st Century, describes a number of concepts for use of HDR energy. There are experimental HDR sites in Europe, Japan, the U.S. and commercial HDR ventures in the process of being developed in Europe and Australia. The Geothermal Resources Council periodically publishes a bulletin dealing with geothermal energy matters. The SPE Paper No. 30738 titled—"Hot Dry Rock: A versatile Alternative Energy Technology" by D. V. Duchane, Earth and Environmental Sciences Div., Los Alamos National Laboratory, presented October 1995 describes the current state of the HDR development.

The public offering prospectus offered by Geodynamics Limited of Australia, entitled "Geodynamics Limited—ABN 55 095 006 090—Power from the Earth—Prospectus" dated Aug. 13, 2002 provides the most modern thought process and effort to develop and commercialize a HDR electrical generation system. The Geodynamics HDR model provides for multiple "lens" of opened natural rock joint groups to be vertically interconnected through common injection and production well bores to provide the basis from which to mine heat from a "triplet" of wells. The heat is mined from the reservoir rock through continuous circulation from an injector well to multiple production wells that provide a pressure sink in order to induce directional circulation. This commonly-known configuration provides a point-to-point directionally-specific pressure-sink-type closed-loop circulation system.

Companies which provide electric power must have sufficient power generating capacity to not only meet base load demand but also must meet peak demand, or maximum demand, which usually occurs in the late afternoon of a hot summer day. Power production apparatus which is in reserve must be capable of being brought on-line very quickly, in order to prevent "brown-outs" or load shedding. Load shedding refers to cutting off power to some users in order to avoid catastrophic shut-down of the entire system. Such apparatus is commonly termed "spinning reserve". Spinning reserve power, or peaking power, is costly because the equipment used to generate spinning reserve power is in revenue-generating use only a portion of the time rather than 24 hours a day. Also, the equipment is generally more expensive to purchase and operate than base-load electric power production equipment.

U.S. Pat. No. 5,685,362, issued Nov. 11, 1997 describes a method for meeting peak power demands with a HDR heat mining system and a power generating plant. Thus, the U.S. Pat. No. 5,685,362 invention effectuates use of an HDR power generation system for electric load following. The U.S. Pat. No. 5,685,362 invention may also be termed on-demand power peaking. Peaking power from an HDR system would be cheaper to generate than peaking power from other sources yet can be sold at the same price as peaking power generated by other means, such as a gas turbine. Use of an HDR system in a load-following mode rather than just to provide base-load power will reduce the total cost of operation of an HDR system. The incremental cost of equipment to operate in peaking mode is expected to be modest. This process is described in an undated paper titled "The Geothermal Analog of Pumped Storage for Electrical Demand Load Following" by Donald W. Brown, Los Alamos National Laboratories, Earth and Science Division, Los Alamos, N. Mex. 87545. The invention U.S. Pat. No. 5,685,362 invention teaches the practice of heat mining by continuous fluid circulation through an injection and multiple production wells coupled with the method of periodic reduction of the production well back pressure to allow a short term flow of a greater volume than the steady state flow volume to be produced thereby providing periodic "peaking" power capacity to provide electrical generation load following characteristics.

The gasification of organic material under supercritical water conditions as taught by Modell et al in U.S. Pat. No. 4,113,446 issued Sep. 12, 1978, titled: Gasification Process, is known in the art. Also the use of a subterranean well bore for the purpose of providing a gravity based reactor vessel from which to perform continuous supercritical water chemical reactions as taught by Titmas in U.S. Pat. No. 4,594,164, issued Jun. 10, 1986, titled: "Method and Apparatus for Conducting Chemical Reactions at Supercritical Conditions", is exemplary of the state of the art that is also known. These teachings provide a process of conversion of organic material by way of supercritical water anaerobic gasification. Oil and gas resources are a finite resource whose production capacity is rapidly declining and it is therefore essential that the organic carbon found in coal that is found in vast quantities on a world wide basis become useful through the ability to convert coal to clean burning fuel gasses and liquids while capturing the various other marketable or harmful constituents for useful sale or disposal as the case may be.

The HDR concept of generating geothermal heat has been know for many decades and has generally been relegated to a non-commercial technology due to the prohibitively high cost of drilling multiple wells into the deeply buried crystalline type Precambrian hot dry rock formations. Modern attempts to commercialize the HDR method of generating geothermal energy have to locate a very unique set of conditions in geologic areas that exhibit exceptionally high geothermal gradients to provide manageable project drilling costs vis-a-vis relatively shallow drilling depths. Typically, these developments seek a site that has significant sedimentary overburden before drilling into the Precambrian formations to access the HDR thus being minimizing drilling costs by drilling a minimal section of the well bore in the Precambrian type rock. Further, these modern attempts to commercialize the HDR geothermal production are economically restricted by the high cost of drilling injection and multiple production wells. The high cost well bores severely constrain the project design from being designed as an optimal production system to mine the maximum heat available in the source rock.

The present invention provides a method of drilling, completing and producing a geothermal reservoir in order to a) economically locate said geothermal reservoirs in most all areas of the world, even those areas with lower thermal gradients that are currently uneconomical to produce, b) economically locate said geothermal reservoirs at depths that provide supercritical water conditions, c) maximize the effective recovery of geothermal heat, per unit volume of HDR formation and d) provide a method of producing and utilizing said geothermal heat energy for individual or simultaneous direct and/or indirect applications such as any individual or combination of the generation and use of high temperature geothermal process steam, the generation and use of geothermal heat energy for the production of electricity and/or the generation and use of geothermal heat energy in the processing of organic carbon or other chemical reactions.

SUMMARY OF THE INVENTION

The present invention relates to a method of drilling, completing and producing a deep geothermal reservoir to allow the economical extraction of thermal energy from geologic strata, which may be termed as Hot Dry Rock (HDR).

In one embodiment, the present invention relates to a method of economically drilling deep well bores in Precambrian and or Hadean Era crystalline rock, such as granites basalts and the like, which is typical of HDR formations. The cost of drilling well bores into HDR using the current practice of rotary-mechanical drilling methods has virtually eliminated the opportunity to tap the vast HDR potential. The novel application of using a predominantly hydraulic based drilling method to overcome the inherent disadvantages of the rotary-mechanical system such as slow rate of penetration and crooked hole tendencies will provide an economical means of tapping into the vast HDR potential. Specifically contemplated is the use of Particle Jet Drilling (PJD) methods of hydraulic drilling to overcome the rotary-mechanical disadvantages. A major advantage of certain embodiments of the present invention includes combining the use of PJD of deep well bores terminating in HDR formations. This should sufficiently reduce the cost of accessing the higher temperature HDR depths providing the highest energy density production possible for economic exploitation of the vast HDR source.

In another embodiment, the present invention relates to a method of developing a high temperature HDR geothermal reservoir to supply the geothermal heat energy for applications such as electrical power generation, including base load and load following capabilities, the processing of various organic materials to produce marketable products such as clean burning fuel gasses and liquids, purified liquids, processed organic waste materials and other chemical reactions.

In another aspect, one embodiment of the present invention relates to a system which provides the sequenced charging and discharging of the HDR reservoir from one or more groups of vertically or horizontally separated dilated rock joint groups or reservoirs. This aspect of the invention provides the ability to produce significantly greater volumes of heat energy from each HDR reservoir system of fractures when compared to the conventional method of producing heat energy from an HDR reservoir system of fractures. Additionally, this method of producing an HDR reservoir system provides an increase in the HDR reservoir productivity over time due to the reservoir enlarging effects of simultaneous thermal and mechanical pressure cycling of the reservoir system when compared to the conventional method of producing an HDR reservoir.

In another aspect, one embodiment of the present invention relates to a method of extracting thermal energy from a rock formation. The method comprising the steps of drilling a plurality of wells to a depth sufficient to allow development of at least one reservoir comprising a cloud of fracture joints, hydraulically fracturing at least one of the plurality of wells, dilating at least one fracture joint cloud reservoir, forcing cooled fluid under high pressure and volume into at least one of the plurality of wells, alternately opening and closing a plurality of discharge control valves and a plurality of injection control valves to provide either periodic or continuous flow from the plurality of wells, removing heated fluid from the wells, and either passing the heated fluid to a heat exchanger or using the produced fluid for direct use applications.

In another aspect, embodiments of the invention provide a method of reducing the high cost of drilling deep well bores terminating in Precambrian and or Hadean Era crystalline rock that are well known in the oil and gas and geothermal industries. The cost of drilling these wells into the Precambrian or Hadean rock is a major part of the cost that limits the depth, diameter, and number of wells that can be used to economically exploit the HDR geothermal resources. The first part of the invented method for producing widespread geothermal resources is the significant reduction of the drilling costs associated with drilling deep well that terminate in Precambrian and or Hadean rock for the purpose of developing HDR engineered reservoirs. The significant drilling cost reduction is achieved by the use of particle jet drilling (PJD) methods to drill the well bore necessary to access, generate and produce the HDR reservoirs.

The experimental use of jetted particles intended for drilling oil and gas wells has been well documented by the oil and gas industry. There are primarily two forms of drilling processes incorporating high mass particles entrained in the drilling fluid. The use of high mass particles entrained in drilling fluids was demonstrated by Gulf Oil Company in the early 1969's based, on U.S. Pat. No. 3,348,189, issued May 21, 1968 and the more recent use of larger diameter high mass particles entrained in the drilling fluid has been patented by the inventor as U.S. Pat. No. 6,386,300 issued May 14, 2002. These references particularly focus on the use of Particle Jet Assisted Rotary Mechanical Drilling (PJARMD). The referenced methods of drilling deep wells with PJARMD embodies the process of entraining discrete high density solid particles in the drilling fluid in order to cut the formation using the impulse energy imparted to the rock by the momentum transmitted from the high mass particles to abrade, chip, fracture, crack, displace or generally fail the formation and remove the formation at a rapid rate. PJARMD processes have been successfully demonstrated in lab tests to increase the drilling rate of various earthen formations. Certain experimental PJARMD field tests have been conducted in conjunction with the drilling of oil and or gas wells in sedimentary formations. The testing of a fully Hydraulic Particle Jet Drilling (HPJD) method of jet drilling crystalline rocks has also been lab and field tested. The application of PJARMD and HPJD for reducing the cost of well bores terminating in Precambrian or Hadean formations is fundamental to the widespread development of the HDR potential. Specifically, PJD provides a means to economically drill large diameter, very deep injection and production well bores for HDR production purposes.

The utilization of the two PJD methods, in concert with specialized completion and production methods further described herein will collectively serve to generate widespread development and use of HDR geothermal energy. Cost effective geothermal well bore drilling provides the ability to locate economical HDR geothermal energy production close to existing end-users in order to displace fossil fuel usage especially when the end-user application is situated on a low thermal gradient site.

The ability to hydraulically dilate the existing natural joints in the crystalline rock at depth to form a network of pressure dilated joint permeability in which fluids can be circulated is well documented in the HDR literature.

The method of HDR heat mining by means of continuous circulation between multiple wells that are so arranged to create a directionally specific point to point pressure sink type flow path through a cloud of dilated joints or fractures that are artificially generated by means of hydraulically fracturing the normally impermeable HDR formation is well documented in the general HDR literature. The present invention relates to the method of producing from a HDR fracture cloud system by means of alternating the hydraulic expansion and contraction of the fracture cloud system in such a manner as to generate coincidental or sequenced thermal and mechanical cycling of the HDR formation in order to generate periodic or continuous near facture surface brecciating within the HDR formation. This brecciation serves the purpose of incrementally exposing new high thermal differential surfaces, on an incremental basis, that will provide the means to maintain high temperature production, mine the HDR formation of heat more effectively through incremental surface exposure and generate an increased reservoir capacity over time through formation brecciation which will increase the surface area that is being swept over time.

Embodiments of the present invention further relate to generating a reservoir production method that eliminates the conventional directionally specific point to point pressure sink type flow path of the commonly known conventional HDR production system. The present invention utilizes the hydraulic pressurization of the reservoir on a per cycle basis to inject fluid into all areas of the reservoir. This charging action stores elastic strain energy in the HDR formation. The reservoir is then allowed to produce the injected fluid to one of more production wells within the reservoir through the contraction of the reservoir volume due to the relaxation of the elastic strain energy stored in the reservoir rock. The flow distributive and recovery flow paths through the joint system generated by this type of production method is omni-directional both during the injection cycle and the production cycle. This has the effect of substantially increasing the surface area swept by the working fluid as opposed to the commonly known methods of point to point pressure sink directionally specific flow paths of the current HDR production methods.

Embodiments of the present invention further relate to the step of developing one or more discrete reservoirs through dilating a group of joints to form said reservoir. This reservoir is then alternately charged and discharged with a fluid in order to dilate the reservoir and cause the fluid to pass into and then subsequently out of the reservoir. This method is expected to force the fluid to sweep the dilated joint surface in two directions thus providing a longer duration for the fluid to be able to absorb the heat from the rock. The cyclical inducement of simultaneous mechanical and thermal stress reversals on the reservoir rock face stresses the crystalline rock at or near the reservoir rock face and causes the reservoir rock face to continuously brecciate or spall exposing new reservoir rock surface. This type of brecciation is termed shear banding and generates a network of crisscrossed fractures on the surface of the larger fracture surface being swept of its heat. This shear band brecciation can form brecciated or spalled rock pieces that range in size from very small to very large depending on many variables. This type of active brecciation continuously provides newly exposed reservoir surface area that will promote greater heat transfer due to incremental exposure of the rock massive to the water sweeping its heat. Further, the brecciation process will provide an ever increasing surface area from which to sweep heat and therefore an increased capacity to produce heat over time. This cyclical method of multiple stress reversals results in a continuous and incremental increase in the high thermal differential surface area exposed and an increase in reservoir volume. The rock formation being broken down by these cyclical stress reversals is expected to provide the ability to continually sweep the heat from the rock formation in a manner that allows an increased efficiency in removing a greater amount of the heat density available per unit volume than with conventional HDR production methods. Additionally, this method of reservoir production provides for little or no water loss as normally characterized by directionally specific point to point pressure sink type flow path closed loop circulation through two or more wells as practiced by prior hot dry rock production methods. These conventional directionally specific point to point pressure sink type flow path HDR production methods tend to hydraulically isolate great portions of the reservoir which may not be produced using the conventional HDR production methods. The production method of the present invention provides a nearly full flow recovery on each pressure cycle of the charged reservoir volume to a central production point(s) due to the omni-directional charge and flow back fluid paths. As the reservoir of the present invention matures, fluid cross-circulation is expected to occur within the reservoir which will assist in convectional heat recovery from the reservoir.

The reservoir systems can be a) a single discrete reservoir that is independently cycled to produce a cyclical or periodic production, b) a set of multiple independent reservoirs that can be cycled and sequenced so as to produce a continuous production flow that can be steady state or fluctuating for purposes such as load following and/or c) a single reservoir that has multiple wells that can serve the purpose of simultaneous injection and production in a manner that the injection wells inject periodically at a rate that exceeds the production rate on a cycled basis in order to cyclically expand the reservoir and store energy in the form of elastic strain while a production well continually produces at a steady or fluctuating rate.

Embodiments of the present invention further relate to reservoirs that can be a) vertically stacked but remain independent and isolated from adjacent reservoirs and b) horizontal arranged but remain independent and isolated from adjacent reservoirs. The arrangement of the reservoirs will be generally dependant on the type and magnitude of the stress field associated with the local HDR formations. The timing of the charging and discharging of the systems can be timed to produce a sequence such that a cyclical or a steady state or steady state with load following production cycles can be generated while still educing coincidental thermal and mechanical cycling that results in the brecciation or spallation of the reservoir rock. Each of the production cycles will have specific production characteristics that can be matched to the end use of the heat energy.

One method of heat production from this type of engineered reservoir is accomplished by the development and production of one or more independently and separated joint system groups through the coordinated cycling of a set of the separated rock joint groups oriented vertically or horizontally to each other such that there is a continuous production of thermal energy from the reservoir group for direct use applications as well as peak load following capacity for such end uses as the generation of electricity.

Another method of heat production from this type of engineered reservoir is accomplished by the development and production of a single jointed reservoir with two or more wells in which the injection well(s) inject periodically or continuously at different injection rates so that the rate is greater than the continuous production rate produced from the, production well(s) such that the reservoir is alternately expanded and then allowed to contract, in order to generate the combined thermal and mechanical stresses necessary to generate in situ reservoir brecciation, while the reservoir is being produced at a continuous rate, either steady state or load following state, from the production well bore. The principle in this case is the operation of single reservoir in a manner that alternately charges the reservoir at a greater rate than the production rate in order to expand the reservoir and then reducing or terminating the injection cycle to allow the reservoir to contract in order to produce the reservoir from the reservoirs stored energy. This type of pressure cycling still provides the benefits of coincidental thermal and mechanical brecciation as heretofore described.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 7 is a diagrammatic schematic of a wellhead and drilling system illustrating the utilization of multiple types of drilling methodology in exposing hot dry rock for developing geothermal reservoirs; and FIG. 8 is a flow chart illustrating one embodiment of the principles of the present invention.

DETAILED DESCRIPTION OF THE DRAWINGS

The present invention will now be described more fully hereinafter with reference to the accompanying drawings, in which preferred embodiments of the invention are shown. This invention may, however, be embodied in many different forms and should not be constructed as limited to the embodiments set forth herein; rather, these embodiments are provided so that this disclosure will be thorough and complete, and will fully convey the scope of the invention to those skilled in the art.

The present invention is based on the development of a discrete system of dilatable fractures in hot rock formations and the subsequent extraction of heat from the hot rock by means of elastically cycling the "inflation" and "deflation" of the reservoir by injecting and recovering an injection fluid such as water. The joints in the rocks open as the reservoir pressure increases due to injecting water into the well bore. The joints in the rock close as the reservoir pressure is decreased due to production of the injection water which has been heated by the reservoir rock. This water can be pumped into the reservoir to be stored and can be withdrawn when water is needed or its production timed to produce in conjunction with other dilatable fracture systems to produce a net continuous flow of produced hot water.

Figure 1:
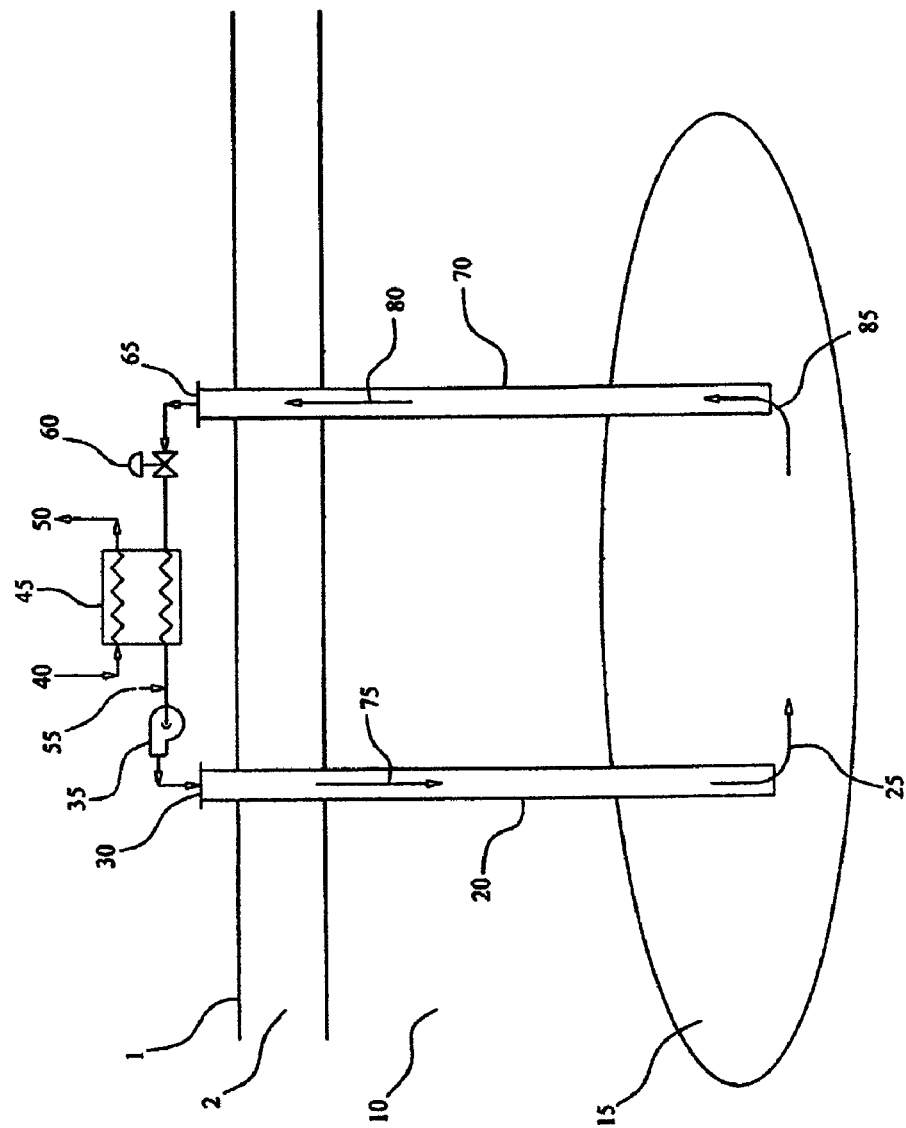
FIG. 1 depicts a simplified general schematic view of a prior art point to point directionally specific pressure sink type closed loop circulation system designed to draw heat from the rock formations.

FIG. 1 depicts an apparatus that has been experimented with by Los Almos National Laboratories to produce hot water from hot rock formations in which the injection fluid, water in this case, was circulated in a continuous closed loop manner. A well bore 20 was drilled from the earth's surface 1 through overlying sedimentary type formations 2 and impermeable crystalline Pre-Cambrian rock formation 10. Cool water 75 was pumped into the cased well bore 20 to dilate the natural joints in the Pre-Cambrian formation to form a network or cloud of interconnected fractures or joints in geothermal reservoir 15. Due to formation stresses of the Pre-Cambrian rock, the reservoir of interconnected fractures is normally elliptical or oblong in shape and may be oriented either horizontally, vertically, or any degree in-between. A second well bore 70 is drilled and cased into the geothermal reservoir 15 in order to create a point to point directionally specific pressure sink type closed loop circulation subsurface system that would provide a pathway to the surface for producing the geothermal heated fluid 80 from the reservoir. Once the reservoir has been generated and the well(s) drilled and cased, surface based equipment is added to create a closed loop circulation system. Wellhead(s) 30 and 65 are installed onto the well bore casing and a heat exchanger 45 is installed to capture the mined heat. Appropriate flow line piping, control valves 60 and pumps 35 are installed. The well can then be circulated by injecting cooled water 75 by means of pump 35 through well bore 20, exiting well bore 20 into the geothermal reservoir 15 in the direction as shown by arrow 25. The water passes through the reservoir in a point to point directionally specific flow path created by the hydraulic pressure sink of production well bore 70 and enters the production well bore 70 as shown by the arrow identifying geothermal heated fluid 85 and is thereby heated. The geothermal heated fluid 80 then returns to the surface through well bore 70 and wellhead apparatus 65. The heated water flows through control valve 60, which is used to maintain adequate back pressure on the production well bore to maintain the dilated fracture joints open sufficiently to minimize flow impedance between the well bores. The heated water proceeds through heat exchanger 45 where the water is cooled by an exchange of heat to a second fluid being flowed through lines 40 to line 50. The cooled water is re-injected down well bore twenty by means of pump 35. This arrangement provides means to flow water through the geothermal reservoir 15 from the injection well bore 20 to the production well bore 70 in what is considered generally as a point to point circuit by means of a pressure differential between the well bores. This type of arrangement does not allow the use of the large amount of heated water stored in the dilated joints that are not flowed through due to becoming pressure isolated between the two well bores. As the geothermal reservoir 15 reacts to the long term dilation pressure, the geothermal reservoir 15 tends to establish pressure equilibrium and therefore grows by enlarging itself until pressure and thermal equilibrium is reached. This process could require the continuous addition of large quantities of make up water which would be injected into the cooled water flow line at point 55 but normally isolated from the production cycle due to pressure isolation as described above. This type of water loss provides a significant disadvantage to the widespread use of this form of HDR completion and production.

The above described system suffers from high flow impedance during the circulating of water through geothermal reservoir 15. Attempts to increase production through increased injection pressure produces greater pressure stimulation of the geothermal reservoir 15 causing further reservoir equilibrium related expansion with the resultant loss of additional water to the pressure isolation described above. Therefore, economic flow rates can only be achieved in this system through drilling multiple wells to provide additive flow in the ends of the geothermal reservoir 15. The over-all system economics is very sensitive to the total cost of the well bores. Therefore, in attempts to minimize the drilling cost, the development of multiple wells and multiple fracture cloud reservoirs is illustrated in FIG. 2.

Figure 2:
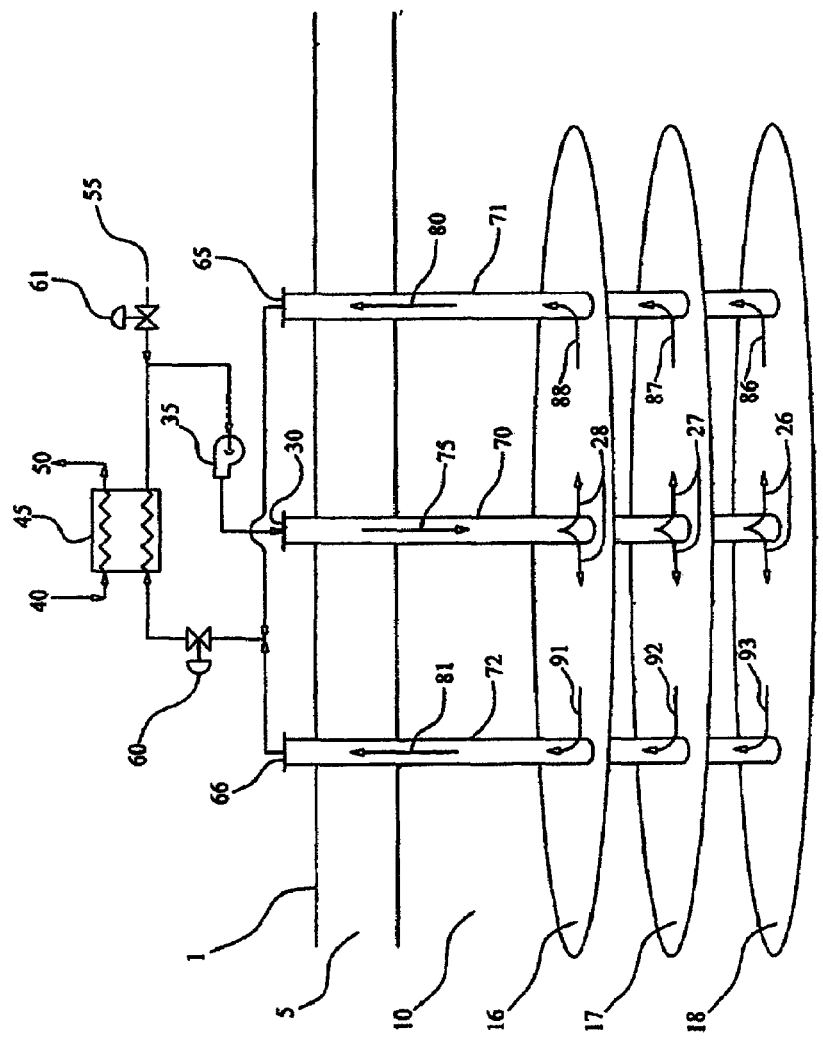
FIG. 2 depicts an improved version of a prior art fractured rock closed loop circulation system that is being experimented with in modern developments such as the commercial hot dry rock attempt being made by Geodynamics Limited of Australia.

FIG. 2 illustrates injection well bore 70 and producing wells 71 and 72 being drilled from the earth's surface through overlying sedimentary formations 2 and Pre-Cambrian rock formation 10. Well bore 70 is used as the development well to hydraulically generate separate fracture cloud lens 16, 17 and 18. The method used to generate these wells is to run and cement a casing string just above the bottom of the well bore. The lower uncased section of the well bore would be hydraulically pressured to induce facture/joint dilation. This lower section would then be hydraulically isolated by filling the lower section with sand to some pre-determined height or a down hole packer set. The well would then be perforated above the sand pack/down hole packer isolation height and the well hydraulically pressured to induce a second discrete fracture cloud at some vertical distance above the lower fracture cloud. Normally these fracture clouds would be oriented vertically up to vertical heights in excess of 3,000 ft. Due to the non-linear increase in drilling cost in Pre-Cambrian rock as a well is deepened, it is likely that only one or two lenses can be economically developed with the economic limits of the depth that can be achieved with normal drilling processes. Once the repetitive cycle of developing the intended number of vertically spaced facture cloud systems has been completed, the sand pack intended to hydraulically isolate lower well bore sections can be removed by direct circulation to clean out the sand plugs and expose the lower fracture clouds to the injection well bore pressure and flow during production operations. In combination, injection well bore 70 and production well bores 7 1 and 72 develop a point to point directionally specific flow path created by the hydraulic pressure sink of production wells in a closed loop circuit system that can generate a cumulative flow rate that may produce commercial volumes of hot water or steam. A similar control and heat recovery system as that used in FIG. 1 can be used in the system of FIG. 2.

Figure 3:
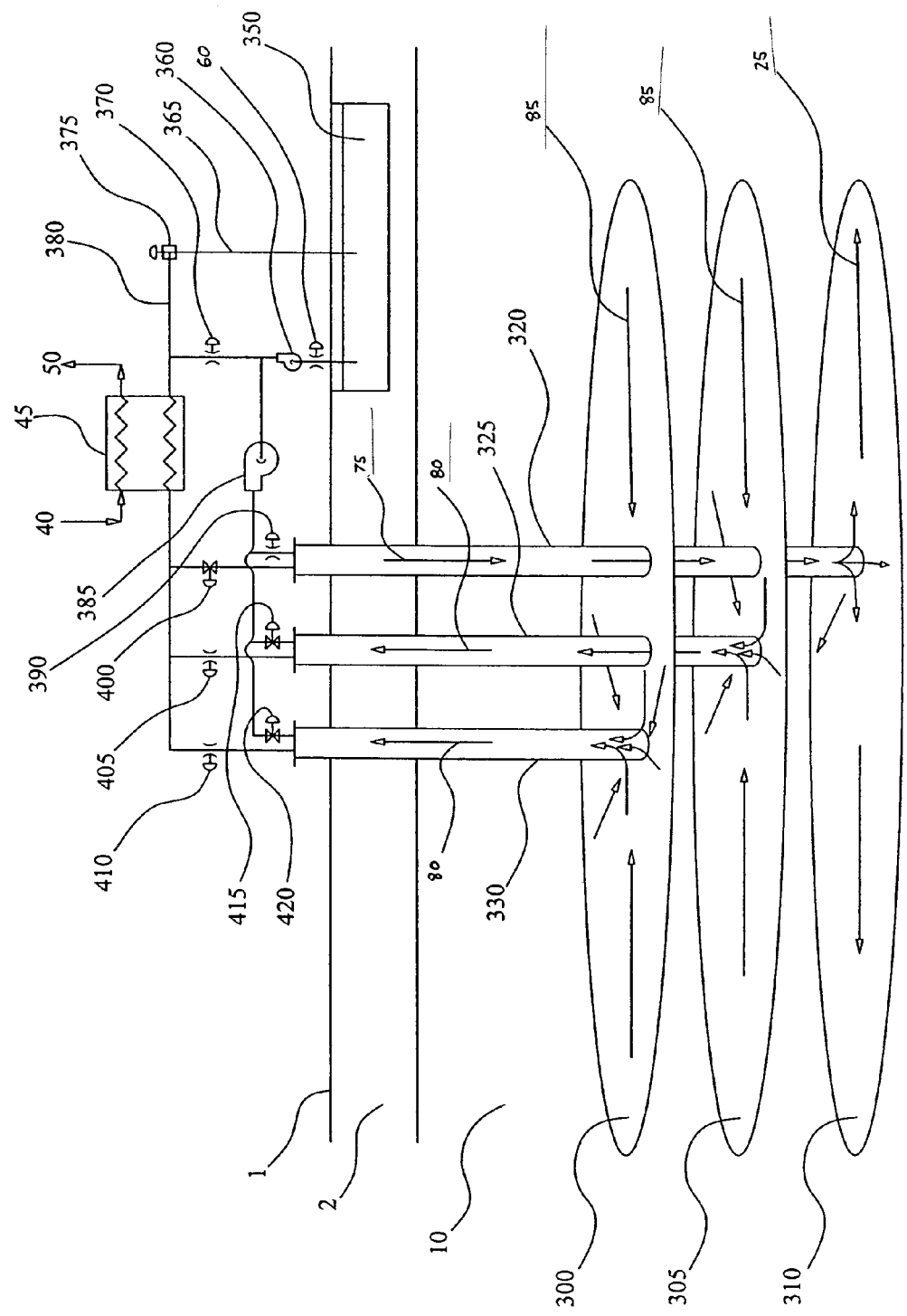
FIG. 3 depicts a general schematic of one embodiment of the HDR production system of this invention and its initial operation cycle.

FIG. 3 depicts one embodiment of the completion scheme and production method of this invention in order to produce heat energy for use in direct and indirect use applications producing bitumen and the generation of electricity. Wells 320, 325 and 330 are drilled from the earth's surface 1 through any sedimentary formations 2 overlying the Pre-Cambrian formation 10, into the Pre-Cambrian formation 10 to a depth of sufficient temperature to allow the development of one or more discrete formation fracture joint clouds 300, 305, 310 which are oriented vertically or horizontally, as determined by the rock formation predominant stress fields, in respect to one another. The deepest well 320, in the case of vertical orientation of the formation fracture clouds, may need to be drilled to a depth greater than 30,000 feet (depending on the thermal gradient of the formation and the required temperature for the end user of the geothermal heat) in order to reach sufficiently high bottom-hole rock temperatures to allow the development of one or more reservoirs above the bottom-hole reservoir. If the facture cloud develops vertically due to the least principle stress being positioned in the vertical position, then each fracture cloud reservoir will need to be separated in the order of 5,000 feet. The second deepest well 325, in this case, would need to be drilled and cased to a depth of 25,000 feet and the third well 330 would need to be drilled and cased to a depth of 20,000 feet. The lowermost portion of each well could be hydraulically fractured to produce a reservoir volume of dilated joints in the formation by pumping at pressures in excess of the joint dilation pressure and the formation break down pressure, which is estimated in the order of 1.0 psi/foot depth. The well bore would then be useable for the pressurization cycle to charge the reservoir followed by the depressurization of the reservoir to flush the heated water from the dilated joints and produce the heat absorbed by the water during the pressurization and depressurization cycle. The same well bore completion process, would be repeated in each of the other two shallower wells in order to develop an aggregate of three discrete reservoirs that would accept pressured water to charge the reservoir through dilating the joints allowing the water to travel into the reservoir, be heated and then expelled from the reservoir when the water pressure is lowered in the well bore. Absorbed heat could be continuously produced by timing the pressure cycling of the well bore to provide one well being injected into at twice the rate that the well is reverse flowed. By offsetting the timing of the flow back section of these wells, it is possible to provide continuous, high flow rate production from this arrangement of reservoirs. A similar process would be necessary to develop reservoirs that are horizontally spaced with the reservoirs in either the vertical or the horizontal orientation.

FIG. 3 shows the necessary configuration to produce continuous high flow heated water flow from three discrete reservoirs separated vertically from each other. Pre-charge pump 355 supplies cooled water from surface reservoir pit 350 to injection pump 385. Injection pump 385 forces cooled water under high pressure and volume into one of the three Hot Fractured Rock (HFR) reservoirs. Injection pump 385 is sized to be able to fully charge a single reservoir at a rate that is equal to the discharge rate of flushing the heated water from the other two HFR reservoirs. In this manner a three well production scheme could provide two wells producing at half the injection rate thereby providing continuous flow by matching the injection and production rate between the three well bores. The wells are managed by alternately opening and closing discharge control vales 410, 405, 400 and injection control valves 390, 415, 420 to provide the proper sequence each 24 hours. The high volume heated water is brought to the surface by the pressure energy stored in the rock during the charging cycle. The heated water is then conducted through a heat exchanger 45 where the heat is transferred from the well discharge flow by means of flowing a second fluid through the heat exchanger lines 40 to 50. The cooled well bore fluid is routed back down the well bore through control valve 370 to injection pump 385. Alternately, the cooled well bore fluid can be discharged from the heat exchanger to the surface reservoir pit 350 by means of line 380 and line 365 on opposite sides of choke valve 375 which controls the system back-pressure. The surface reservoir pit 350 would be used to store any reserve water necessary to provide make-up water as the reservoirs mature.

Figure 4:
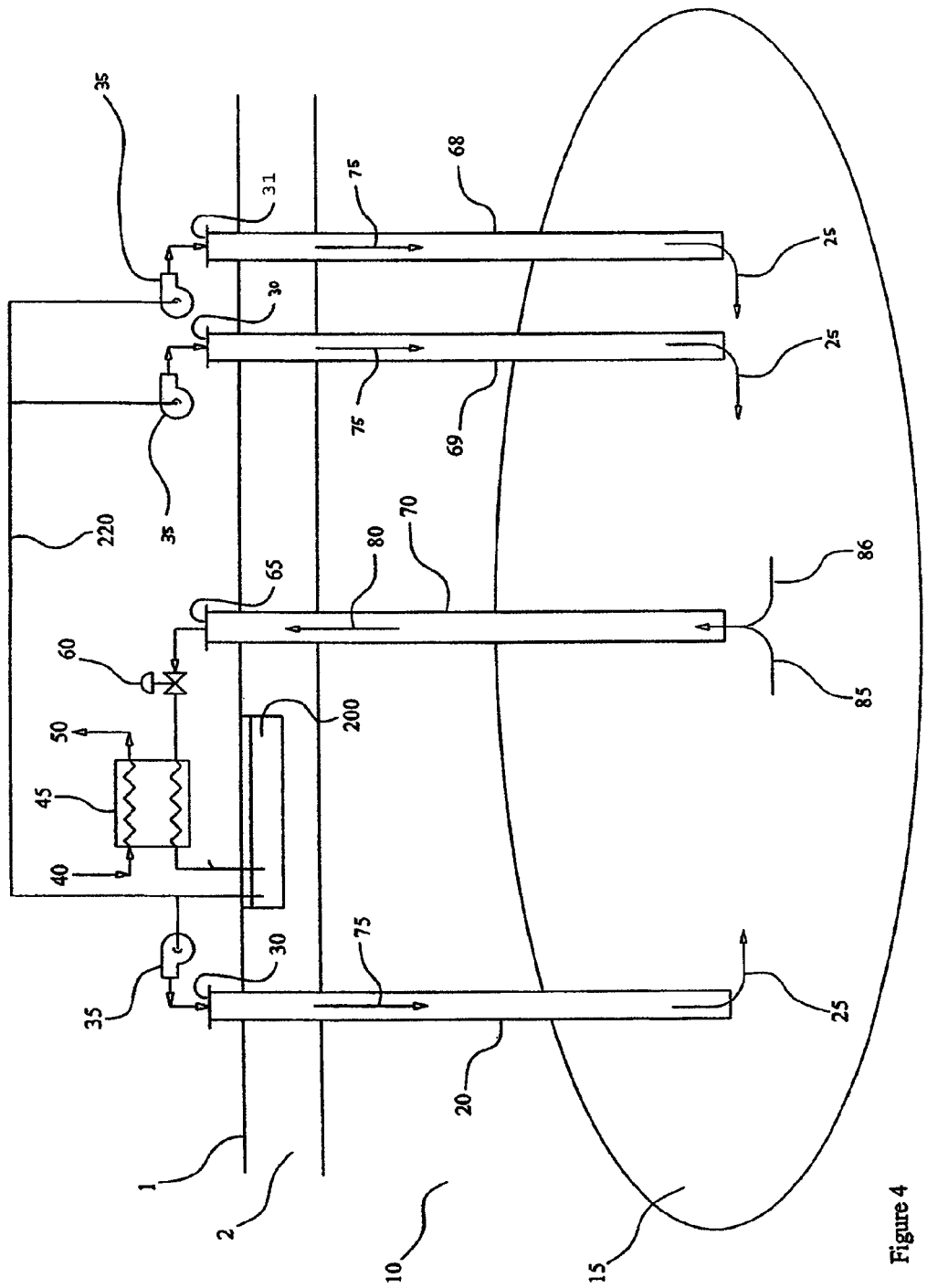
FIG. 4 depicts a general schematic of a second embodiment of the HDR production system of this invention to generate geothermal heat energy.

FIG. 4 depicts another embodiment of the completion scheme and production method of this invention in order to produce heat energy for use in direct and indirect use applications such as producing bitumen and the generation of electricity. Well 70 would drilled and cased from the earth's surface 1 through any sedimentary formations 2 overlying the Pre-Cambrian rock formation 10, into the Pre-Cambrian rock formation 10 to a depth of sufficient temperature to allow the development of a discrete formation fracture joint clouds which are oriented vertically or horizontally, as determined by the rock formation predominant stress fields, in respect to one another. The geothermal reservoir 15 would be hydraulically fractured to produce a desired reservoir volume of dilated joints in the formation by pumping a liquid at pressures in excess of the joint dilation pressure and the formation break down pressure, which is estimated in the order of 1.0 psi/foot of depth. Additional wells 68, 69 and 20 would be drilled and cased into geothermal reservoir 15 at some predetermine distance from the production well 70. The preferred embodiment would use two wells 70 and 68. FIG. 4 illustrates the use of an additional well 69 as an injection well to illustrate the flexibility of the engineered nature of the present invention in order to reduce parasitic pressure losses in the injection wells. Further additional production wells may be desirable to reduce the parasitic pressure losses in the production well(s). The wells 68, 69 and 20 would act as injection wells in order to pressurize the geothermal reservoir 15. Additional fracturing of the geothermal reservoir 15 may be desirable to increase the productive volume of geothermal reservoir 15 once the injection wells 68, 69 and 20 have been drilled, cased and hydraulic communication has been established with production well 70. The production well 70 would be utilized to produce injected fluids at a rate commensurate with the end use. This production rate could be a) a steady production rate. b) a steady production rate with periodic increases and/or decreases to accommodate load following needs of the end use and/or c) a periodic stop and start flow rate tuned to the end use requirements. The injection wells 68, 69 and 20 are intended to inject at a higher injection rate than is being produced in the production well 70 until the maximum elastic energy of the geothermal reservoir 15 is reached. The injection flow will then be cut back or terminated in order allow the stored elastic strain in the geothermal reservoir 15 be relieved by deflating the reservoir and producing the heated water contained in the geothermal reservoir 15. The pressure level in geothermal reservoir 15 will be allowed to be reduced through the relaxation of the geothermal reservoir 15 stored elastic strain to a predetermined level sufficient to maintain the dilation of the joints in the geothermal reservoir 15. Once this predetermined level of relaxed elastic strain has been relieved to the predetermined level, the injection of fluid will begin or increase as the case may be. This method of repeated dilation and deflation of the geothermal reservoir 15 will produce a) omni directional flow of the injection fluid setting up conditions that allow the production of the injection fluid from omni directional flow paths towards the production well, b) produce the simultaneous and/or periodically alternating thermal and mechanical cycling in order to produce brecciation or spallation of the joint surface areas producing newly exposed high thermal differential surfaces that can be swept of their heat, c) the arrangement of the injection wells to the production wells is intended to provide a secondary convectional sweeping of heat as the fluid circulates through the geothermal reservoir 15 as well as the primary conduction sweeping of heat from the surface of the dilated joints and d) the arrangement of the injection wells to the production wells is intended to minimize thermal depletion near the production well by remotely injecting the working fluid forcing it through both conduction and convection type flows. The geothermal reservoir 15 would be useable for the pressurization cycle to charge the geothermal reservoir 15 followed by the depressurization of the geothermal reservoir 15 to flush the heated water from the dilated joints and produce the heat absorbed by the water during the pressurization and depressurization cycle.

Figure 5:
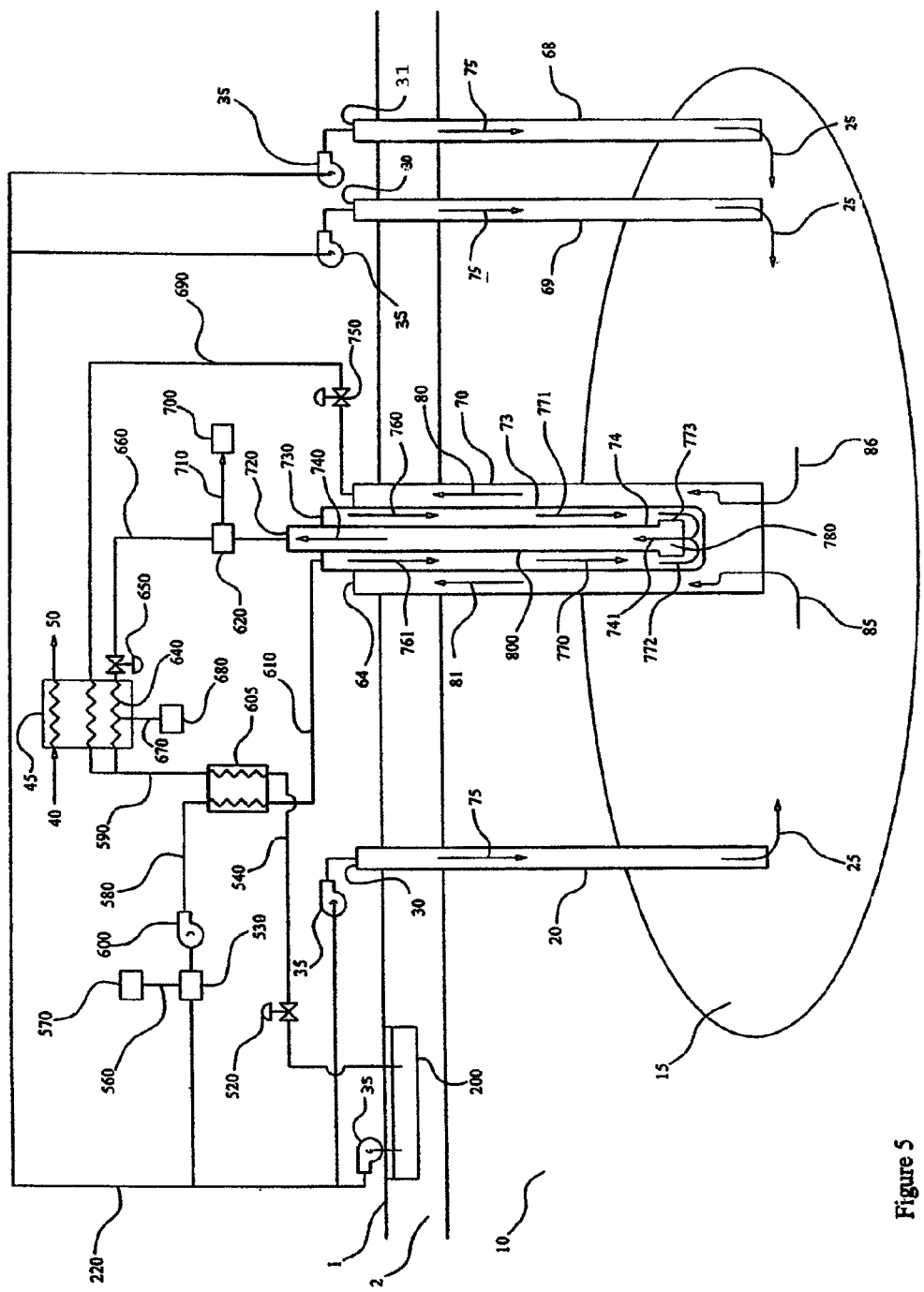
FIG. 5 depicts a general schematic of a third embodiment of the HDR production system of this invention utilizing geothermal heat energy to process organic carbon under supercritical conditions.

FIG. 5 depicts another embodiment of the completion scheme and production method of this invention in order to produce and utilize geothermal heat energy for use in the processing of organic carbon under supercritical fluid conditions. The basic steps of processing organic carbon under supercritical conditions is well documented in the public domain. Exemplary are the descriptions provided by Modell in U.S. Pat. No. 4,113,446 issued Sep. 12, 1978, titled: Gasification Process and further in U.S. Pat. No. 4,338,199 issued Jul. 6, 1982, titled: Processing Methods for the Oxidation of Organics in Supercritical Water. Titmus and others have describe the use of deep cased well bores as pressure containment vessels in various configurations in order to continuously process chemical reactions by using the various tubular configurations within the well bores as pressure containment vessels and utilizing the natural hydrostatic head gradient within the well bore as a means to conveniently inject feedstock and recover product. Titmus describes in U.S. Pat. No. 3,853,759 issued Dec. 14, 1974, titled: Dynamic Hydraulic Column Activation Method the method of using deep well bores as reaction vessel for continuous processing of various chemical reactions. Titmus further describes the use of deep well bores for the purpose of reacting continuous chemical processes under supercritical water conditions in U.S. Pat. No. 4,594,164, issued Jun. 10, 1986 and further in U.S. Pat. No. 4,792,408, issued Dec. 20, 1988. The descriptions of Modell and Titmus require a chemical, electrical or fuel based process to initiate and then maintain the elevated internal temperatures within the pressure vessel reactor sections at temperatures necessary to promote supercritical water conditions. In Modell's description, the requisite supercritical water condition pressure is generated by a pumping means and in Titum's description; the requisite supercritical water condition pressure is achieved by the assistance of the natural hydrostatic head of the well bore. The present invention combines certain understandings and aspects of the teachings of Modell and Titmus and further adds the aspect of providing an integrated geothermal heat production system to initiate and sustain chemical processes under supercritical fluid conditions through the use of a pressure vessel reactor system installed within the production well of a geothermal heat production system as generally described in the description of FIG. 4.

The embodiment of FIG. 5 builds on the embodiment of FIG. 4 with the additional step of inserting a tubular reactor vessel 73 into the cased well bore 70 through wellhead 64 modified to accept said the tubular reactor vessel 73. In principle, the geothermal reservoir 15 is located in an HDR formation that provides the ability to produce a supercritical fluid which is preferably water. The geothermal production system is set up to circulate continuously according to the description of FIG. 4, and will be mined for its heat content for a) heating the reactor vessel to promote a continuous chemical reaction within the reactor vessel, b) providing heat to generate useful work at the surface such as generating electricity by means of circulating the geothermal water produced from said geothermal reservoir 15 to the surface where it can be used and 3) preheat the organic feed stock as described hereinafter.

The embodiment of the invention shown in FIG. 4 is modified in the embodiment of FIG. 5 only in that the geothermal reservoir 15 is developed at such a depth as to produce geothermal fluid temperatures in excess of 375° C. and preferable above 450° C. The produced geothermal heated fluids 85 and 86 is flowed around a reactor vessel 73 placed concentrically within cased well bore 70 to the surface. The produced geothermal heated fluids 85, 86, 80 and 81 conducts heat into reactor vessel 73 in order to heat heterogeneous organic carbon slurry 761, 760, 770 and 771 to a temperature above 375° C. The produced geothermal heated fluids 80 and 81 are passed through wellhead 64, through control valve 750, through line 690 and into heat exchanger 45 where the geothermal working fluid is expanded and then condensed to remove the bulk of its heat. The condensed geothermal liquid is then flowed from heat exchanger 45 through line 590 where it is combined with effluent from the reactor vessel where the combined fluids are circulated through heat exchanger 605 to provide heat energy to preheat the heterogeneous organic carbon slurry as herein after described.

A heterogeneous organic carbon slurry is formed within mixing processor 530 by combining water from water reservoir 200 pumped by pump 500 to mixing processor 530 through supply line 220 and 550 and organic carbon material and appropriate catalysts or retarders sourced from stockpile 570 through line 560. The heterogeneous organic carbon slurry is then pumped by pump 600 through line 580 and through heat exchanger 605 where the heterogeneous slurry is preheated by the final enthalpy transfer of the produced geothermal heated fluid 80. The heterogeneous organic carbon slurry flows through line 610 from heat exchanger 605 and into reactor vessel annulus space through wellhead 730. The heterogeneous organic carbon slurry is thereby pumped down the annular space between the concentric walls of reactor vessels 73 and where it is heated above supercritical water temperature by the action of the geothermal heated fluids 80, 81, 85 and 86 produced from geothermal reservoir 15. As the heterogeneous organic carbon slurry is pumped down the reactor vessel annulus, it is subjected to pressures greater that supercritical water pressures at which point the heterogeneous organic carbon slurry reacts and forms a single phase fluid with some non-organic precipitates The length of the reactor vessel flow path is such that the dwell time of the organic material under supercritical water conditions provides sufficient circulation time to exceed the necessary reaction time for the disassociation of the organic material into its elemental constituents. The fluid is flowed or pumped around the end of reactor vessel 800 into the interior of reactor vessel 800 through chamber 773 where the produced fluid 741 and 740 is returned to the surface and through wellhead 720. The produced fluid 741 and 740 heat the descending heterogeneous organic carbon slurry as they pass the common tubular wall of reactor vessel 800. The produced fluid 740 passes through wellhead 720 and into particulate separator 620, where the inorganic process product particulate is separated from the liquid stream and where the solid particulate is passed through line 710 to solid particulate storage container 700. The clarified produced fluid then passes through flow line 660 through control valve 650 to gas separator 640 where the clarified produced fluid is processed to allow the gases to be separated from the liquid component of the clarified produced fluid. The gasses are drawn off through line 670 and further separated into their various species in gas classifier 680 and are subsequently removed for further processing. The heat energy available from the clarified produced fluid is recovered in heat exchanger 45 to produce useful heat energy. The fluid then flows from heat exchanger 45 into line 590 where it is commingled with the fluid resulting from the heat exchange process of the produced geothermal heated fluids 80 and 81. The commingled effluents from heat exchanger 45 are conducted to heat exchanger 605 where any residual heat is further exchanged as a preheat process for the heterogeneous organic carbon slurry being flowed through heat exchanger 605. From heat exchanger 605 the effluent fluid is flowed through line 540, through control valve 520 and through line 510 to be discharged into water reservoir 200.

The embodiment in FIG. 5 provides a method of utilizing geothermal heat energy contained in produced geothermal fluids that are above 375° C. to initiate and or maintain a continuous or periodic supercritical reaction in a reactor vessel immersed within said geothermal production well.

Figure 6:
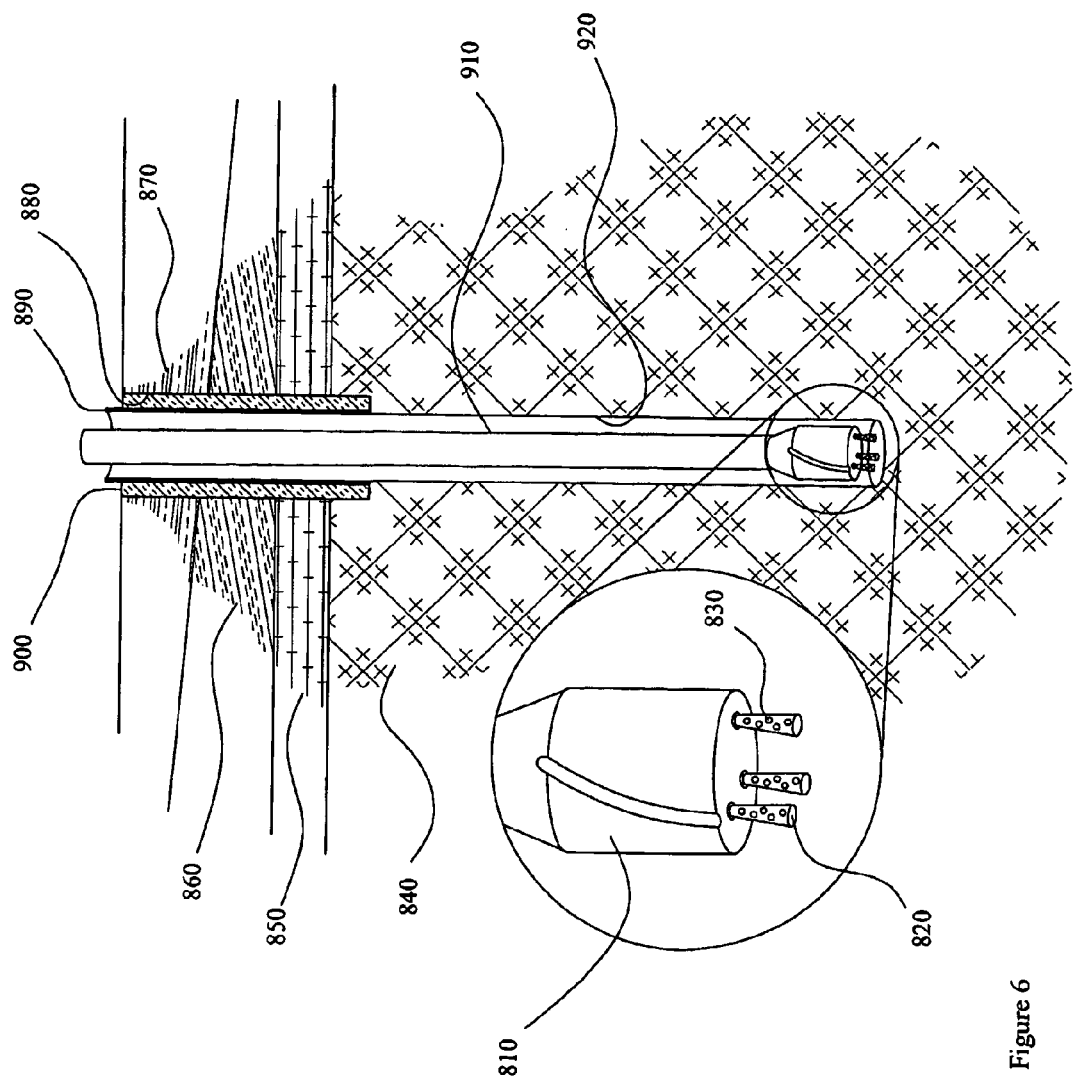
FIG. 6 is a diagrammatic illustration of the principal components necessary to drill a geothermal well bore utilizing PJD methodology.

FIG. 6 illustrates the principle components necessary to drill a geothermal well bore utilizing a PJD methods of drilling the well. It is common knowledge that drilling large diameter deep well bores in Precambrian rock is prohibitively expensive with commonly practiced rotary-mechanical earthen formation drilling practices. The slow rate of penetration associated with the rotary-mechanical drilling systems has been the principle cause of the huge potential of the HDR geothermal energy resource to languish. The use of PJD techniques and methods provides a means to increase the rate of penetration in all formations and particularly the crystalline rocks sufficiently to reduce the time and cost to a level that will provide the potential for widespread use of geothermal energy.

The experimental use of PJARMD intended for drilling oil and gas wells has been well documented by the oil and gas industry. The experimental use of high mass particles entrained in drilling fluids was demonstrated by Gulf Oil Company in the early 1969's based, on U.S. Pat. No. 3,348,189, issued May 21, 1968 and the more recent use of larger diameter high mass particles entrained in the drilling fluid has been patented by the inventor as U.S. Pat. No. 6,386,300 issued May 14, 2002. The referenced methods of drilling with jetted particles embodies the process of entraining discrete high density solid particles into the drilling fluid circulated during the drilling operation in order to jet impinge the particle laden slurry against the formation thereby cutting the formation through the impulse energy imparted to the rock by the momentum transmitted from the action of the high mass particles. Both the PJARMD and HPJD processes have been successfully demonstrated in lab tests to increase the drilling rate of penetration in various earthen formations. Certain experimental field tests have been conducted in sedimentary type formations. Heretofore, PJARMD has been developed and or tested for the commercial purpose of drilling sedimentary formations that hold oil and gas reserves. These sedimentary formations are generally found above Precambrian rock formations. Sedimentary formations are comprised of stratified shale, sandstone and limestone and or their metamorphosed material. Drilling sedimentary formations with PJARMD techniques involves the use of a rotary-mechanical drill bit that is assisted by the use of jetted particle. PJARMD requires careful balance of the slurry fluid properties and operating parameters. The Effective Circulating Density (ECD) of the drilling slurry fluid containing high mass particles must be maintained carefully so as not to break down any sedimentary formations such as shale, sandstone or limestone. The need to carefully control the ECD in sedimentary formations is expected to have a significant limiting factor in widespread use of PJD as a means for drilling oil and gas wells in sedimentary formations due to the potential chronic and problematic formation breakdown know as loss circulation conditions. Secondly, the use of PJARMD methods is better suited to the relatively smaller well bore diameters use in oil and gas production.

The use of HPJD techniques for drilling Precambrian rocks at great depth is essential for economic development of deep HDR geothermal resources. HPJD can be utilized in competent well bore formations where ECD is not a controlling factor. Formations such as the crystalline Precambrian and Hadean formations lend themselves well to minimized ECD effects thereby allowing full use of HPJD without the need to rotary mechanical drilling assistance. FIG. 6 illustrates one method of drilling a deep well bore terminating in crystalline rock for the purpose generating a HDR geothermal reservoir. The general geometry illustrates the sedimentary rock formations 870, 860 and 850 which typically overlay the Precambrian rock formations 840. The sedimentary formations 870, 860 and 850 are generally stratified formations of different sedimentary rock material such as shale, sandstone and limestone. These formations can be drilled by either normal rotary-mechanical or PJARMD means as is appropriate for the sedimentary section make-up and thickness. The sedimentary section of the well bore 880 will be isolated from the deeper well bore 920 by means of a casing tubular 890 which is typically cemented in place by cement sheath 900. Drill pipe 910 which is manipulated by a drilling rig (not shown) provides the conduit and tubular connection to the HPJD drill bit 810. HPJD drill bit 810 provides the means to jet impinge the high mass particles 830 accelerated within the typical PJD drill bit nozzle jet flow 820 onto the Precambrian rock formations in order to rapidly drill said formations. The novelty of drilling through and isolating the sedimentary formation in order to expose only the crystalline Precambrian formation for drilling by means of HPJD methods provides the ability to utilize optimum HPJD operating conditions to maximize the rate of penetration while drilling said Precambrian formations that are not available while drilling sedimentary formations. The use of low viscosity fluids for HPJD particle entrainment, transportation, impingement and return circulation duties are thus available for drilling in Precambrian formation as there is no need to significantly consider ECD properties due to the integrity of the Precambrian formation as opposed to the lack of integrity of integrity of well bore exposed sedimentary formations. The use of very high PJD fluid flow rates can also be used while drilling Precambrian formations as there is no need to significantly consider drilling fluid formation erosion again due to the integrity of the Precambrian formations.

The use of PJD methods for reducing the cost of drilling well bores terminating in Precambrian or Hadean formations is fundamental to the widespread development of the HDR potential. Specifically, PJD provides a means to economically drill large diameter, very deep injection and production well bores for HDR production purposes. The specific well bore geometry, used in conjunction with PJD techniques, is unique to producing the environment to operate the PJD techniques at optimal levels for rate of penetration performance purposes.

Referring now to FIG. 7, there is shown a diagrammatic schematic illustration of the drilling of a well bore within a plurality of earthen formations. At the wellhead 400 represented by the diagrammatic illustration of a derrick, a first earthen formation 404 is penetrated by well bore 402. The type of drill bit utilized in this particular formation may be a mechanical drill bit conventional for shallow wells and/or the PJARMD referenced herein. Diagrammatically represented in lower earthen formation 406 is a drill bit 414 which may be the same as and/or similar to the drill bit 412 but may vary in accordance with the principles of the present invention depending on the type of earthen structure found in earthen section 406. Likewise, earthen section 408 is a continuation of the well bore 402 and illustrates diagrammatically, a drill bit 416 which may be of a different methodology in accordance with the principles of the present invention, depending on the type of structure engaged in earthen formation 408. Finally, earthen formation 410 is diagrammatically represented as a Precambrian and/or Hadean crystalline rock wherein the cross-sectional profile thereof is varied and the bore hole section 430 is shown penetrated by a hydraulic drilling methodology found in the drilling tool 418 which may incorporate particle jet drilling in accordance with the principles of the present invention for penetrating the Precambrian or Hadean crystalline rock formation for accessing the thermal energy therein and establishing a site within the bore hole for subsequent hydraulic fracturing and the charging and discharging described above in accordance with the principles of the present invention.

Referring now to FIG. 8 there is shown a flow diagram of one embodiment of the principles of the present invention. In this particular flow diagram, the methodology described above is clearly set forth and shown wherein step 501 includes the establishment of a bore hole drilling system in accordance with the principles of the present invention. Step 503 illustrates the drilling of a first bore hole section with a PJARMD methodology. This methodology may change depending upon the particular type of the earthen formation as illustrated in FIG. 7.

Still referring to FIG. 8, the step 505 represents the bore hole reaching the Precambrian or Hadean crystalline rock formation where the type of drill bit being used may vary in accordance with the principles of the present invention. Step 507 illustrates drilling a second, lower bore hole section through the Precambrian or Hadean crystalline rock formation with hydraulic drilling methodology. One form of the HPJD methodology set forth and described in the present invention is particle jet drilling. Step 509 illustrates the hydraulically fracturing of the hot dry rock (HDR) to produce a fracture cloud of dilated joints. Step 511 illustrates the step of charging and discharging the fracture cloud in accordance with one embodiment of the principles of the present invention. Step 513 illustrates producing thermal energy from the fracture cloud in accordance with the principles of the present invention as described above.

In summary, the above-referenced description has described and shown the following inventive aspects of the present invention:

1) The use of HPJD for drilling well bores that terminate in a) non-sedimentary formations or b) Precambrian formations or Hadean formations for the purpose of developing hot dry rock geothermal resources.

2) The method of drilling and isolating sedimentary formations, with or without PJD methods for the purpose of drilling underlying crystalline, non-sedimentary, Precambrian or Hadean formations with PJD techniques.

3) The use of non-rotary-mechanical means to drill well bores that terminate in a) non-sedimentary formations or b) Precambrian formations or Hadean formations for the purpose of developing hot dry rock geothermal resources.

4) The use of non-mechanical drill bit means to drill well bores that terminate in a) non-sedimentary formations or b) Precambrian formations or Hadean formations for the purpose of developing hot dry rock geothermal resources.

5) The use of low viscosity or Newtonian drilling fluid in conjunction with PJD for drilling drill well bores that terminate in a) non-sedimentary formations or b) Precambrian formations or Hadean formations for the purpose of developing hot dry rock geothermal resources.

6) The use of PJD fluid flow rates equal to or greater than 500 gallons per minute to drill well bores that terminate in a) non-sedimentary formations or b) Precambrian formations or Hadean formations for the purpose of developing hot dry rock geothermal resources.

7) The use of non-standard drill pipe to drill well bores that terminate in a) non-sedimentary formations or b) Precambrian formations or Hadean formations for the purpose of developing hot dry rock geothermal resources.

8) Using PJD methods to drill well bores that are 9.00" or greater in diameter that terminate in a) non-sedimentary formations or b) Precambrian formations or Hadean formations for the purpose of developing hot dry rock geothermal resources.

Using PJD methods to drill well bores that are 5,000 feet deep or greater that terminate in a) non-sedimentary formations or b) Precambrian formations or Hadean formations for the purpose of developing hot dry rock geothermal resources.

The following concepts are thus contemplated to be within the spirit and scope of the present invention:

1) hi generating the HDR reservoirs, the conventional thought is to continuously circulate the between two or more wells through flow paths in the induced rock fractures or dilate natural occurring rock joints in the HDR reservoir. This "hydraulic short-circuiting" or point to point flow is both limiting in its capacity to 1) absorb heat, 2) suffer from high flow impedance, and 3) hydraulically isolate the bulk of the fluids contained in the fracture cloud reservoir. The method of this invention provides elastic cycling of the charging and discharging of a reservoir which provides full use of the reservoir fracture system through omni-directional flow in the charging process and omni-directional flow reverse flow during the reservoir relaxation process. Further, the waters ability to absorb heat is a function of its dwell time when in contact with the surface area of the reservoir. This method provides relatively longer dwell times as the water has to first be swept into the rock joints and then swept out of the rock joint sequentially during the formation charging and relaxation cycle. Further, the omni-directional flow provides a vastly increased surface area for the water to be heated from during each cycle when compared to conventional HDR completion systems. This double pass flow regime will provide significantly improved heat transfer to the produced water.

2) The use of cyclical stress reversals, both mechanical and thermal will provide for significant rock surface breakdown over time due to these combined cyclical stress reversals. By breaking down the reservoir rock into relatively small blocks or rock chunks or pieces of rock through shear banding brecciation or spallation, the reservoir surface area and reservoir volume are increased, providing an increasing area from which to draw heat as the omni-directional fluid paths sweep the "hydraulic container" surface area. The brecciated rock is hydraulically isolated once it has broken free of the fracture surface. Gravity will pull the spalled rock to the lower most regions of the reservoir where it will be pulverized over time through the action of the mechanical cycling of the reservoir rock. There are two thermal mechanisms to draw heat from during conduction in this setting, the near field and far field heat conduction. The near field heat is transferred by conduction very quickly due to the high temperature differentials between the rock and the sweeping fluid. Once this near field heat is drawn to a lower threshold, further heat transmission is governed by the rock medium diffusivity values. By far the greatest heat sweeping effects are gained by the continuous exposure of the injection fluid to the next "hydraulic container" surface due to cyclical related shear banding brecciation. It is expected that the shear banding brecciation will continually produce a new contact surface to interact with the injection fluid before the high heat levels of the near field region have been reduced to a level that triggers far field heat diffusivity to act upon the reservoir wall thus reducing the heat transfer rate. The described action provides a near-continuous refreshing of the high temperature differentials available for near field conductive heat sweeping over time. This is opposed to the conventional HDR systems that must rely on far field heat diffusivity of the far field rock massif once the near field heat has been conductively swept which has the effect of significantly lowering the total heat output and the production temperature over time. Therefore the ability to generate a new surface area in an expanding reservoir is the key to sustaining the near field type conduction values. As the rock reacts to the thermal and mechanical stresses of repeated cycling during production, new surface area is generated as the rock contracts as the effects of thermal change as well coincidental mechanical displacement act upon the interior rock surface of the reservoirs "hydraulic container."

3) The reservoir can be enlarged through additional fraccing above the fracture dilation pressures in order to extend or generate a larger base reservoir. This would serve the purpose of increasing the base reservoir size, growing the base reservoir more rapidly than it would with just the cyclical action of the charging and discharging cycles, to compensate for maintaining temperature in the reservoir if necessary.

4) This method of geothermal production produces a far greater production rate and ultimate recovery potential than any other method currently being utilized due to the increased surface area sweeping and new surface exposures over time.

5) The use of produced geothermal temperatures above 375° C. to provide heat energy in support of chemical reactions in a reactor vessel immersed in the geothermal production well provides the basis of converting large volumes of organic carbon, such as coal, oil shale, biomass and waste to useable and marketable products. The produced geothermal heat energy provides a) the heat energy to initiate or sustain the supercritical water chemical process within the reactor vessel, b) provides the residual heat energy to conduct direct and indirect use of the produced geothermal fluid for such end uses as generating electricity through binary type power generation plants, and c) providing further heat yields to preheat the organic carbon feedstock. The system derives its economic value by generating clean electrical power and producing clean burning hydrogen while separating and capturing any harmful byproducts in forms that can be further processed, disposed of effectively or marketed. The use of the cyclical geothermal reservoir flexing production method to provide steady state production from a single reservoir and providing the benefits of the cyclical injection process to maintain high thermal production temperatures, flow rates and reservoir growth supports the ability to use utilize geothermal production for large scale continuous as opposed to batch processing of organic carbon such as coal, oil shale, biomass and waste to produce clean water and marketable products such as $H_2$ methane or Fischer-Tropsch liquids. This system would be useful in the processing of coal at existing power plants and supplying them with clean burning fuel gasses to enhance economics and reduce industrial production of greenhouse gasses. There are currently approximately 700 coal fired electrical power plants the US alone that would significantly benefit from this invention. Further, this invention provides an enabling technology for the large scale processing of mineable oil shale.

It is thus believed that the operation and construction of the present invention will be apparent from the foregoing description of the preferred embodiments. While the configurations and designs as shown are described as being preferred, it will be obvious to a person of ordinary skill in the art that various changes and modifications may be made therein without departing from the spirit and scope of the invention, as defined in the following claims. Therefore, the spirit and the scope of the claims should not be limited to the description of the preferred embodiments contained herein.

What is claimed is:

1. A method of extracting thermal energy from a rock formation, the method comprising the steps of:
    drilling a plurality of wells to a depth sufficient to allow development of at least one fracture joint cloud reservoir;
    hydraulically fracturing at least one of the plurality of wells;
    dilating the at least one fracture joint cloud reservoir;
    forcing cooled water under high pressure and volume into at least one of the plurality of wells to charge the at least one fracture joint cloud reservoir;
    alternately opening and closing a plurality of discharge control valves and a plurality of injection control valves to provide a continuous production rate from the plurality of wells and permit discharge from the at least one fracture joint cloud reservoir;
    removing heated water from at least one of the plurality of wells; and
    passing the heated water to a heat exchanger.

2. The method of claim 1, wherein the step of drilling includes the step of hydraulic drilling.

3. The method of claim 2, wherein the step of hydraulic drilling includes particle jet drilling.

4. The method of claim 1, wherein a volume of the at least one fracture joint cloud reservoir is increased through simultaneous mechanical and thermal cycling.

5. The method of claim 1, wherein heat values in the at least one fracture joint cloud reservoir are maintained through mechanical and thermal cycling of reservoir rock within the at least one fracture joint cloud reservoir.

6. The method of claim 5, wherein the volume of heat that may be swept in the at least one fracture joint cloud reservoir is increased through thermally and mechanically cycling the reservoir rock.

7. The method of claim 1, wherein the step of opening and closing further includes the step of timing the opening and closing to produce a sequence of cycles with steady state load following production cycles generated while still inducing coincidental thermal mechanical cycling that results in brecciation and spallation of the reservoir rock.

8. The method of claim 7, wherein the method of extracting thermal energy is further facilitated by utilizing at least two wells wherein an injection well injects periodically at different injection rates so that an injection rate is periodically greater than the continuous production rate produced from a production well such that the at least one fracture joint cloud reservoir is alternately expanded and then allowed to contract in order to generate the combined thermal and mechanical stresses necessary to generate in situ reservoir brecciation while the reservoir is being produced at a continuous rate.

9. The method of claim 7, wherein the method is further facilitated by utilizing at least three wells.

10. A method of completing geothermal production wells including the steps of:
    drilling a plurality of wells from at least one wellhead through a plurality of earthen formations;
    utilizing a first type of drill bit through first upper earthen formations for the generation of a well bore;
    utilizing a particle jet drilling bit for bore hole creation within a hot dry rock region disposed beneath the first earthen region;
    terminating a first plurality of bore holes in a first Precambrian formation to a depth of sufficient temperature to allow the development of one or more discreet formation fracture joint clouds which are oriented vertically or horizontally as determined by the rock formation;
    terminating a second of the plurality of bore holes into a lower region for creating a lower fracture joint cloud generally horizontally disposed beneath the first cloud; and
    hydraulically fracturing each cloud to produce a reservoir volume of dilated joints in the formation by pumping at pressures in excess of the joint dilation pressure and the formation break down pressure.

11. The method as set forth in claim 10, and further including terminating a third bore hole beneath the regions of termination of the first and second bore holes.

12. The method as set forth in claim 10, wherein the step of fracturing includes imparting a pressurization cycle to charge the reservoir followed by the depressurization of the reservoir to flush the heated water from the dilated joints that produce the heat absorbed by the water during the pressurization and depressurization cycle.

13. The method as set forth in claim 12 and further including repeating the process of charging and depressurizing each cloud to develop an aggregate of a plurality of discreet reservoirs that will accept pressurized water to charge the reservoir during dilating the joints allowing the water to travel into the reservoir to be heated and then expelled from the reservoir when the heated water pressure is lowered in the well bore from a wellhead.

14. The method of claim 13 including the step of continuously producing heated water by timing the pressure cycling of the well bore to provide one well being injected into at twice the rate the well is reversed flowed.

15. The method of claim 14 and further including routing cooled well bore fluid back down the well bore through a control valve to an injection pump.

16. The method of claim 14 and further including discharging cooled well bore fluid from the heat exchanger to a surface reservoir pit.

17. The method of claim 10, wherein the step of fracturing comprises the step of dilating a plurality of material joints in the formation.

18. The method of claim 10, wherein the step of drilling includes drilling an upper well portion with a rotary mechanical drill bit.

19. The method of claim 18, where the rotary-mechanical drill bit comprises Particle Jet Assisted Rotary Mechanical Drilling (PJARMD) methodology.

20. A method of drilling deep well bores from a wellhead into Precambrian and Hadean Era crystalline rock formations for accessing thermal energy therein comprising the steps of:
    establishing a bore hole drilling system from the wellhead with at least a first and a second type of drilling methodology, the first methodology including rotary-mechanical drilling and a second methodology including hydraulic drilling;
    drilling a first bore hole section from the wellhead and into a first formation utilizing the first methodology of the rotary-mechanical drilling;
    drilling a second bore hole section beneath the first bore hole section into the crystalline rock formation with the second drilling methodology of hydraulic drilling;
    exposing the thermal energy within the crystalline rock for the access thereto; and
    imparting multiple stress reversals to create a continuous and incremental increase in high thermal differential surface area and reservoir volume whereby continual removal of heat from the rock formation allows much greater efficiency by removing a greater amount of heat density available per unit volume.

21. The method of claim 20, wherein the hydraulic drilling includes particle jet drilling.

22. The method of claim 21, wherein the particle jet drilling methodology includes the process of entraining discreet high density solid particles in a drilling fluid for cuffing the formation.

23. The method of claim 22, wherein the formation cutting uses impulse energy imparted to the formation by momentum transmitted to the entrained particles by the jetting fluid in order to abrade and crack the formation.

24. The method of claim 23, and further including removing the abraded formation at a rapid rate through the flow of fluid therearound.

25. The method of claim 21 and further including completing the well bore to access a thermal energy reservoir in the formation through the steps of dilating a group of joints to form the reservoir; and
    alternating charging and discharging the group of joints with a fluid in order to dilate the reservoir and causing the fluid to pass into and then subsequently flow out of the thermal energy reservoir.

26. The method of claim 25 and further including the cyclic inducement of simultaneous mechanical and thermal stress reversals on the reservoir rock causing the rock to continuously brecciate and therein exposing new reservoir rock surface (shear banding).

27. The method of claim 20, wherein the first formation comprises a single discreet reservoir that is independently cycled to produce a cyclical or periodic production.

28. The method of claim 20, wherein the first formation includes a set of multiple independent reservoirs that may be cycled in sequence so as to produce a continuous production flow that can be steady state and fluctuating.

29. A method of developing a high temperature hot dry rock geothermal reservoir for accessing geothermal heat energy therein and production therefrom, the method comprising the steps of:
    establishing a bore hole drilling system with at least a first and second type of drilling methodology, the first methodology including rotary-mechanical drilling and a second methodology including hydraulic drilling;
    drilling a first bore hole section utilizing the rotary-mechanical drilling;
    drilling a second bore hole section beneath the first bore hole section into crystalline rock with the hydraulic drilling;
    exposing thermal energy within the crystalline rock for the access thereto;
    fracturing the crystalline rock into a fracture cloud with at least some of the fractures in flow communication with the second bore hole section;
    pumping bore hole fluid down the first and second boreholes to hydraulically expand the fractures; and
    alternating hydraulic expansion and contraction of the fracture cloud to generate coincidental thermal and mechanical cycling of hot dry rock formations and periodic brecciation within the hot dry rock formation, whereby the periodic brecciation serves the purpose of incrementally exposing new high thermal differential services on an incremental basis that will serve the purpose of maintaining high temperature production in the hot dry rock formation.

30. The method as described in claim 29, wherein the hydraulic expansion is effected in an omni-directional manner both during the injection cycle and the production cycle for substantially increasing the surface area swept by the working fluid.

31. The method of claim 29, wherein the hydraulic drilling includes particle jet drilling.

32. The method of claim 31, wherein the particle jet drilling methodology includes the process of entraining discreet high density solid particles in a drilling fluid for cuffing the formation.

33. The method of claim 32, wherein the formation cutting uses impulse energy imparted to the formation by momentum transmitted to the entrained particles by the jetting fluid in order to abrade and crack the formation.

34. The method of claim 33, and further including removing the abraded formation at a rapid rate through the flow of fluid therearound.

35. The method of claim 29, wherein the reservoir system comprises a single discreet reservoir that is independently cycled to produce a cyclical or periodic production.

36. The method of claim 29, wherein the reservoir system includes a set of multiple independent reservoirs that may be cycled in sequence so as to produce a continuous production flow that can be one of steady state and fluctuating.

37. The method as set forth in claim 29 and further including a single reservoir having multiple wells serving the purpose of simultaneous injection and production in a manner that an injection rate periodically exceeds a production rate on a per cycle basis in order to cyclically expand the reservoir and store energy in the form of elastic strain while a production well continually produces at a steady or fluctuating rate.

38. The method as set forth in claim 37 and further including a second reservoir wherein the reservoirs are vertically stacked while remaining independent one from the other.

39. The method as set forth in claim 37 and further including a second reservoir wherein the reservoirs are generally horizontally arranged while remaining independently isolated one from the other.

40. A method of developing geothermal reservoirs in hot dry rock formations, the method including the steps of:
    establishing a bore hole drilling system with at least a first and second type of drilling methodology, the first methodology including rotary-mechanical drilling and the second methodology including hydraulic drilling;
    drilling a first bore hole section utilizing the rotary-mechanical drilling;

drilling a second bore hole section beneath the first bore hole section into crystalline rock with hydraulic drilling methodology;

exposing thermal energy within the crystalline rock for the access to joints therein;

dilating a first group of joints to form a first reservoir;

dilating a second group of joints to form a second reservoir;

alternately charging and discharging the first group of joints with a fluid in order to dilate the first reservoir and cause the fluid to pass into and then subsequently flow out of the first reservoir;

alternately charging and discharging the second group of joints with a fluid in order to dilate the second reservoir and cause the fluid to pass into and then subsequently flow out of the second reservoir; and cycling the first and second reservoirs in sequence so as to produce a continuous production flow that can be steady state and/or fluctuating.

41. The method as described in claim 40 and further including the cyclic inducement of simultaneous mechanical and thermal stress reversals on the first and second group of joints causing the first and second group of joints to continuously brecciate and therein exposing new reservoir rock surface.

42. The method as described in claim 40 including the step of imparting multiple stress reversals to create a continuous and incremental increase in the high thermal differential surface area and reservoir volume whereby the ability to continually sweep the heat from the rock formation in a manner that allows much greater efficiency in removing a greater amount of heat density available per unit volume is provided.

43. The method as set forth in claim 40 and further including having multiple wells serving the purpose of simultaneous injection and production in a manner that at least one injection well injects periodically at a rate that exceeds a production rate on a per cycle basis in order to cyclically expand the first and second reservoirs and store energy in the form of elastic strain while the production well continually produces at a steady or fluctuating rate.

44. The method as set forth in claim 43, wherein the first and second reservoirs are vertically stacked while remaining independent one from the other.

45. The method as set forth in claim 43, wherein the first and second reservoirs are generally horizontally arranged while remaining independently isolated one from the other.

46. The method as set forth in claim 40 wherein the step of charging and discharging of the system further includes the step of timing the charging and discharging to produce a sequence of cycles with steady state load following production cycles generated while still inducing coincidental thermal mechanical cycling that results in the brecciation and spallation of reservoir rock in the first and second reservoirs.

47. The method as set forth in claim 40 and further including drilling at least two wells wherein an injection well injects periodically at different injection rates so that an injection rate is greater than a continuous production rate produced from a production well such that the first and second reservoirs are alternately expanded and then allowed to contract in order to generate the combined thermal and mechanical stresses necessary to generate in situ reservoir brecciation while at least one of the first and second reservoirs is being produced at a continuous rate.

48. A method of completing geothermal production wells including the steps of drilling a plurality of wells through a plurality of earthen formations;

utilizing a first type of drill bit through first upper earthen formations for generation of a well bore;

utilizing a particle jet drilling bit for bore hole creation within a hot dry rock region disposed beneath the first earthen region;

terminating a first bore hole in a first Precambrian formation to a depth of sufficient temperature to allow the development of one or more discreet formation fracture joint clouds which are oriented vertically or horizontally as determined by the rock formation;

terminating a second of the plurality of bore holes into a lower region for creating a lower fracture joint cloud generally horizontally disposed beneath the first cloud; and hydraulically fracturing each cloud to produce a reservoir volume of dilated joints in the formation by pumping at pressures in excess of the joint dilation pressure and the formation break down pressure.

49. A method of extracting thermal energy from a rock formation, the method comprising the steps of:

drilling one or more wells to a depth sufficient to allow development of at least one reservoir comprised of fractures or joints within the rock formation;

hydraulically fracturing or dilating natural joints in the formation through at least one of the wells;

dilating at least one of the fractures of joints within the rock formation thereby forming the at least one reservoir;

forcing cooled water under high pressure and volume into at least one of the one or more of wells to charge the at least one reservoir and create elastic strain within surrounding rock;

alternately opening and closing at least one set of discharge control valves and at least one set injection control valves to provide flow to and from at least one of the wells and permit alternate charging and discharging to and from the at least one reservoir;

removing heated water from the one or more wells;

removing at least a portion of the heat from the produced water and using the heat produced from the heated water for thermal purposes.

50. A method of generating geothermal production wells including the steps of:

drilling a plurality of wells from the surface through a plurality of earthen formations;

utilizing a first type of drilling system and method to drill through a first upper sedimentary type earthen formations for generation of a well bore;

utilizing a second type of drilling system and method for bore hole creation within a non-sedimentary region disposed beneath the first upper sedimentary earthen region;

terminating a first plurality of bore holes in a first Precambrian formation to a depth of sufficient temperature to allow the development of one or more discreet formation fracture joint clouds which are oriented as determined by the rock formation in situ stress fields;

terminating a second of the plurality of bore holes into a lower region for creating a lower fracture joint cloud generally horizontally disposed beneath a first cloud; and hydraulically fracturing each cloud to produce a reservoir volume of dilated joints in the formation by pumping at pressures in excess of a joint dilation pressure and a formation break down pressure.

51. A method of developing a high temperature hot dry rock geothermal reservoir for accessing geothermal heat energy therein and production therefrom, the method comprising the steps of:

establishing a bore hole drilling system with at least a first and second type of drilling methodology, the first methodology including rotary-mechanical drilling or Particle Jet Assisted Rotary Mechanical Drilling (PJARMD) and a second methodology including hydraulic drilling;

drilling a first bore hole section utilizing the rotary-mechanical drilling or PJARMD;

drilling a second bore hole section beneath the first bore hole section into crystalline rock with hydraulic drilling methodology;

exposing the thermal energy within the crystalline rock for the access thereto;

fracturing the crystalline rock to form a fracture cloud with at least some of the fractures in flow communication with the second bore hole section;

pumping bore hole fluid down the first and second borehole sections to hydraulically expand the fractures; and alternating the hydraulic expansion and contraction of the fracture cloud to generate coincidental thermal and mechanical cycling of hot dry rock formations and the periodic brecciating within the hot dry rock formation, whereby the brecciation serves the purpose of incrementally exposing new high thermal differential surfaces on an incremental basis that will serve the purpose of maintaining high temperature production in the hot dry rock formation.

52. The method as described in claim 51 wherein the hydraulic expansion is effected in an omni-directional manner both during the injection cycle and the production cycle for substantially increasing the surface area swept by the working fluid.

* * * * *